United States Patent
Huang et al.

(10) Patent No.: US 10,633,050 B2
(45) Date of Patent: Apr. 28, 2020

(54) HANDLEBAR STRUCTURE OF BICYCLE

(71) Applicant: Giant Manufacturing Co., Ltd., Taichung (TW)

(72) Inventors: Bo-Hao Huang, Taichung (TW); Hua-Chun Huang, Taoyuan (TW)

(73) Assignee: Giant Manufacturing Co., Ltd., Taichung (TW)

( * ) Notice: Subject to any disclaimer, the term of this patent is extended or adjusted under 35 U.S.C. 154(b) by 0 days.

(21) Appl. No.: 16/234,523

(22) Filed: Dec. 27, 2018

(65) Prior Publication Data

US 2019/0202522 A1    Jul. 4, 2019

(30) Foreign Application Priority Data

Dec. 29, 2017 (TW) .............................. 106146422 A (51) Int. Cl.

| | |
|---|---|
| *B62K 21/12* | (2006.01) |
| *B62L 3/02* | (2006.01) |
| *B62K 21/18* | (2006.01) |
| *B62K 11/14* | (2006.01) |
| *B62J 99/00* | (2020.01) |

(52) U.S. Cl.
CPC .............. *B62K 21/12* (2013.01); *B62K 11/14* (2013.01); *B62K 21/18* (2013.01); *B62L 3/02* (2013.01); *B62J 2099/0046* (2013.01)

(58) Field of Classification Search
CPC ........ B62K 11/14; B62K 21/12; B62K 21/14; B62K 21/145; B62K 21/18

USPC .............................................. 74/551.1, 551.8
See application file for complete search history.

(56) References Cited

U.S. PATENT DOCUMENTS

| | | | |
|---|---|---|---|
| 5,598,744 A * | 2/1997 | Chen ...................... | B62K 21/12 403/362 |
| 6,869,091 B1 | 3/2005 | Anderson et al. | |
| 2006/0145446 A1 * | 7/2006 | Schmider .............. | B62K 19/30 280/281.1 |

FOREIGN PATENT DOCUMENTS

| | | |
|---|---|---|
| CN | 203958502 | 11/2014 |
| TW | M241324 | 8/2004 |
| TW | M325281 | 1/2008 |

* cited by examiner

*Primary Examiner* — David H Bollinger
(74) *Attorney, Agent, or Firm* — JCIPRNET (57) ABSTRACT

A handlebar structure of bicycle suited for being assembled to a stem of a bicycle is provided. The handlebar structure includes a body and a reinforcement member. The body has a first segment fixed to the stem, a second segment, and a third segment held by a rider, wherein the second segment is connected between the first and the third segments. One portion of the reinforcement member is fixed to the stem, and another portion of the reinforcement member is disposed on the second segment. A two-dimensional Cartesian system x-y based on an orthogonal cross-section of the second segment is constructed, and a scope of the second segment being covered by the reinforcement member contains at least a second quadrant of the two-dimensional Cartesian system x-y, wherein the bicycle moves in a positive x-axis direction of the two-dimensional Cartesian system x-y.

16 Claims, 6 Drawing Sheets

HANDLEBAR STRUCTURE OF BICYCLE

CROSS-REFERENCE TO RELATED APPLICATION

This application claims the priority benefit of Taiwan application serial no. 106146422, filed on Dec. 29, 2017. The entirety of the above-mentioned patent application is hereby incorporated by reference herein and made a part of this specification.

BACKGROUND OF THE INVENTION

Field of the Invention

The invention relates to a handlebar structure and particularly relates to a handlebar structure of bicycle.

Description of Related Art

Because of simple structures of bicycles and their conveniences, bicycles can not only be transportation tools, but be tools used on exercising and leisure activities mostly. At the same time, with the change of times, athleisure trend has been on the rise in recent years. Bicycles have gradually change from transportation tools to entertaining and fitness tools. Bicycles have once again become vehicles people relying on, and gained an important place in sports.

For a road rider, he has to change his bicycle to different states as according to different road conditions. For example, when the rider changes to a pumping or pump track position to overcome road conditions (e.g., hill climbing), his body moves away from his seat and thus lifts up his center of gravity. At this time, the rider adds a force onto the handlebar structure to gain enough support. Therefore, it is necessary that the handlebar has enough structural rigidity and is not easily deformed so as to support the rider while in the pumping or pump track state.

In contrast, when the rider rides on a plain road, the rider does not need to add additional force at this time. Hence, the rider only needs to rest hands on the handlebar structure. At this time, the handlebar structure directly transmits vibration generated by the road to the rider as the handlebar structure still has the structural rigidity required in the previous pump track state. In this way, both of the rider's hands are prone to be uncomfortable for receiving vibration from the road.

Based on the above, how the handlebar structure to provide required structure conditions for riders corresponding to different riding states is an issue needed to be solved by people skilled in the art.

SUMMARY OF THE INVENTION

A handlebar structure of bicycle is provided, which provides required holding conditions for a rider in response to different riding states.

The handlebar structure of bicycle is suitable for being assembled to a stem of a bicycle. The handlebar structure includes a body and a reinforcement member. The body has a first segment fixed to the stem, a second segment, and a third segment held by the rider, wherein the second segment is connected between the first segment and the third segment, and the third segment is extended from the second segment to form an end structure of the body. One portion of the reinforcement member and the stem are fixed to each other, and another portion of the reinforcement member is disposed on the second segment. A two-dimensional Cartesian system x-y based on an orthogonal cross-section of the second segment is constructed, and a scope of the second segment being covered by the reinforcement member contains at least a part of a second quadrant of the two-dimensional Cartesian system x-y, wherein the bicycle moves in a positive x-axis direction of the two-dimensional Cartesian system x-y.

The handlebar structure of bicycle suited for being assembled to a stem of a bicycle, the handlebar structure includes a body and a reinforcement member. The body has a first segment, a second segment, and a third segment. The first segment is fixed to the stem, the second segment is connected between the first and the third segments, and the third segment is extended from the second segment to form an end structure of the body. One portion of the reinforcement member and the stem are fixed to each other, and another portion of the reinforcement member is disposed on the second segment. The reinforcement member covers the second segment of the body and blocks at a deformation direction of the second segment when a rider drives the bicycle to move on a ground plane along a first direction. The deformation direction includes a second direction, a third direction, and any direction included and between the second direction and the third direction, wherein the second direction is opposite to the first direction, and the third direction deviates from the ground plane.

In an embodiment of the invention, a joint area moment of inertia of the second segment and the reinforcement member is greater than an area moment of inertia of the first segment.

In an embodiment of the invention, a neutral axis of the joint orthogonal cross-section of the second segment and the reinforcement member renders an offset relative to a neutral axis of the orthogonal cross-section of the first segment.

In an embodiment of the invention, an offset direction deviates from a ground plane where the bicycle is.

In an embodiment of the invention, the offset direction renders an included angle relative to the ground plane, and the included angle is less than 90° or equal to 90°.

In an embodiment of the invention, the offset direction is the same as a force direction applied on the third segment by the rider in a pump track state.

In an embodiment of the invention, an orthogonal projection of the third segment on the two-dimensional Cartesian system is located in a fourth quadrant.

In an embodiment of the invention, the scope of the second segment covered by the reinforcement member extends from the second quadrant to a first quadrant or a third quadrant.

In an embodiment of the invention, a neutral axis of the joint orthogonal cross-section of the second segment and the reinforcement member is located in the second quadrant.

In an embodiment of the invention, an x-axis of the two-dimensional Cartesian system is parallel to a ground plane where the bicycle is, and a y-axis of the two-dimensional Cartesian system is orthogonal to the ground plane where the bicycle is.

In an embodiment of the invention, the reinforcement member has a fourth segment and a fifth segment, the fourth segment and the first segment are held by the stem, and the fifth segment extends from the fourth segment and covers a portion of the second segment.

In an embodiment of the invention, the handlebar structure further includes a bushing, held together with the second segment and the fourth segment by the stem.

In an embodiment of the invention, the bicycle has a brake lever and a brake wire. The brake lever is disposed on the third segment, and the brake wire is connected to the brake lever, passes through the reinforcement member, and merges into the stem.

In an embodiment of the invention, the third direction is orthogonal to the ground plane.

In an embodiment of the invention, the reinforcement member is blocked at a deformation direction of the reinforcement member when a rider applying a force on the third segment and drives the bicycle to a pumping or pump track state.

Based on the above, the handlebar structure of bicycle includes the body and the reinforcement member, wherein the portion of the reinforcement member and the body are fixed together to the stem, and another portion of the reinforcement member is disposed on the second segment of the body. That is, in the two-dimensional Cartesian system x-y constructed based on the orthogonal cross-section of the second segment, the scope of the second segment covered by the reinforcement contains at least the second quadrant of the two-dimensional Cartesian system x-y, wherein the bicycle moves in the positive x-axis direction of the two-dimensional Cartesian system x-y. In this way, a designer thus designs the body to have better flexibility, such that the vibration produced in response to traveling by the bicycle is absorbed by the handlebar structure. Hence, the rider is able to rest his hands on the handlebar structure without being affected by the discomfort caused by the vibration. More importantly, the reinforcement member is disposed on a deformation direction in response to the second segment. That is to say, when the rider pumps back, though the force caused by the third segment may produce deformation of the second segment of the body owing to torque, the reinforcement member blocks at the deformation direction of the second segment to strengthen the structural rigidity of the body on the second segment. The deformation are thus effectively eliminated, and the handlebar structure maintains better structural rigidity in this state, providing enough supporting force for the rider.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
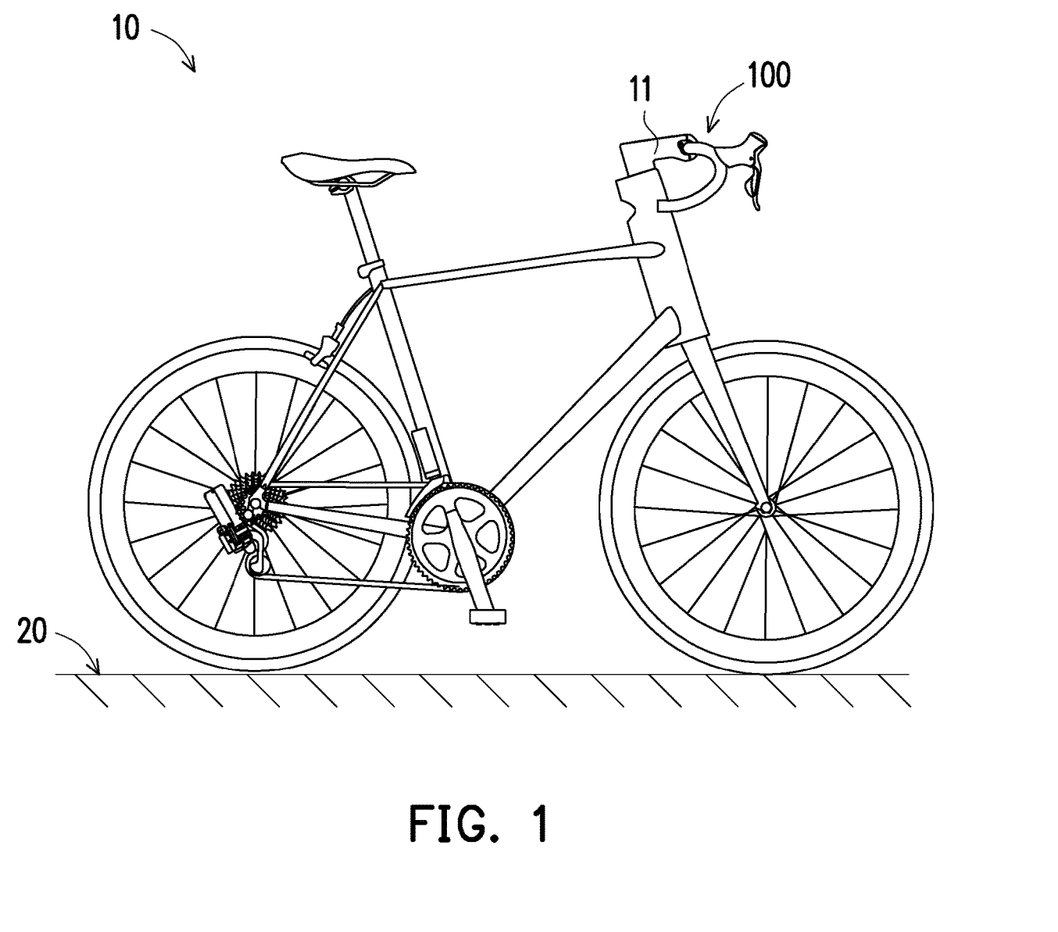
FIG. 1 is a schematic view of a bicycle according to an embodiment of the invention.

FIG. 1 is a schematic view of a bicycle according to an embodiment of the invention.

Figure 2:
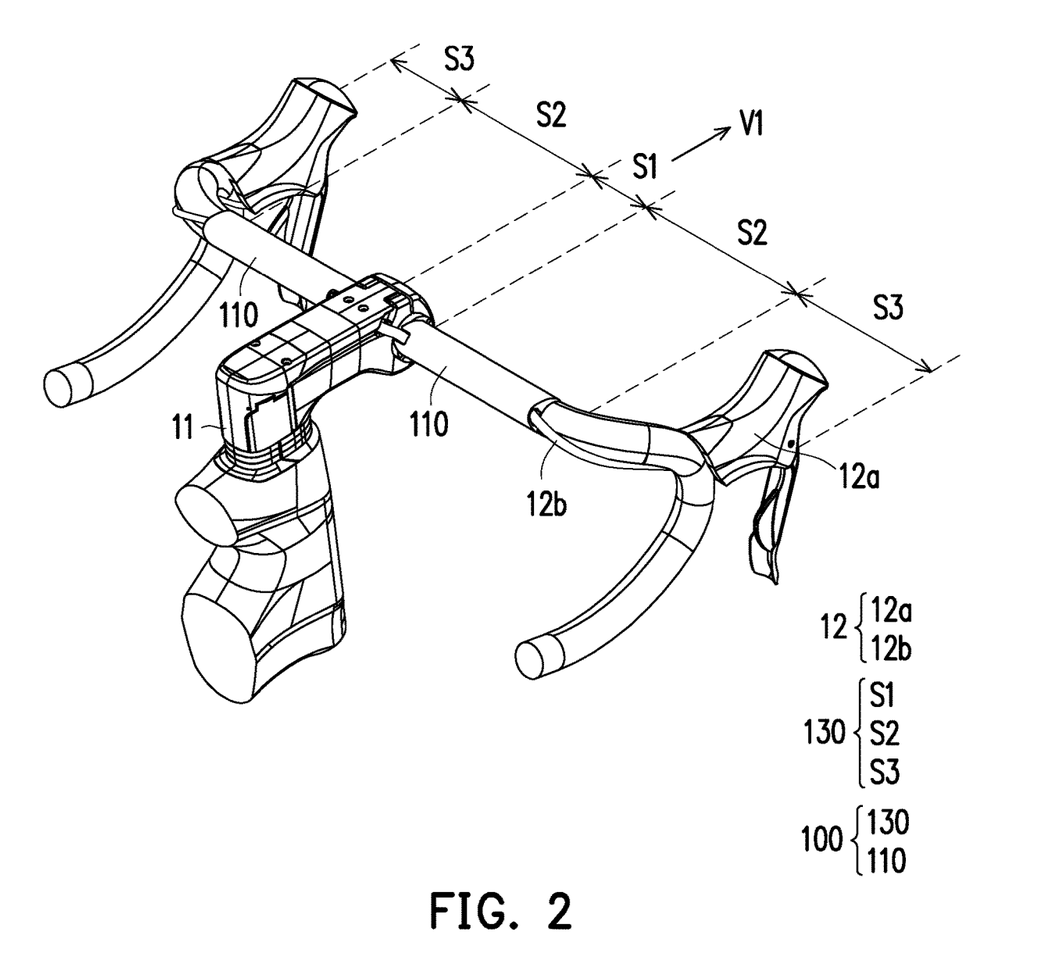
FIG. 2 is a partial enlarged view of a handlebar structure of the bicycle in FIG. 1.
Figure 5:
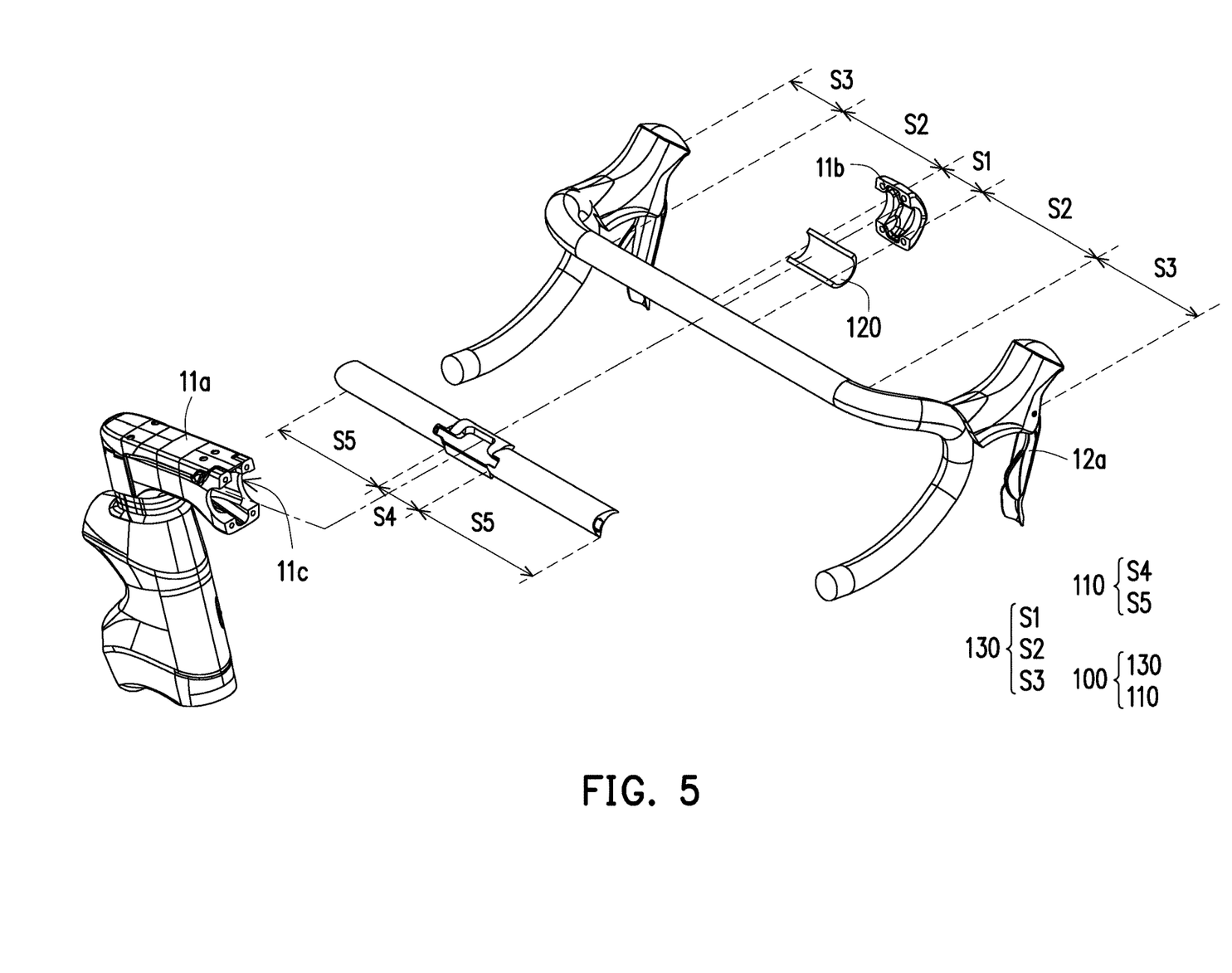
FIG. 5 is an explosive view of the handlebar structure in FIG. 2.

FIG. 2 is a partial enlarged view of a handlebar structure of the bicycle in FIG. 1. FIG. 5 is an explosive view of the handlebar structure in FIG. 2. Please refer to FIG. 1, FIG. 2 and FIG. 5. In this embodiment, a handlebar structure 100 of a bicycle 10 includes a body 130 and a reinforcement member 110 assembled to a stem 11. Based on the stem 11, the body 130 is further divided into a first segment S1, a second segment S2, and a third segment S3, wherein the first segment S1 is assembled to the stem 11, the second segment S2 is connected between the first segment S1 and the third segment S3, the third segment S3 is extended from the second segment S2 to form an end structure of the body, wherein the third segment S3 is a bent handlebar for the rider to hold. Besides, the first segment S1 and the second segment S2 are seen as straight lines. One side of the reinforcement member 110 is assembled to the stem 11, and the other side of the reinforcement member 110 is disposed on the second segment S2 of the body 130. As illustrated in FIG. 2, the body 130 of this embodiment is symmetrical to the stem 11. Therefore, the handlebar structure 100 includes two reinforcement members 110 disposed on the second segment S2 respectively. However, this embodiment is not limited the number of the reinforcement member 110.

Moreover, the reinforcement member 110 and the stem 11 are fixed to each other in several ways. For example, a portion of the reinforcement member 110 is clamped by the stem 11, or the portion of the reinforcement member 110 is fixed to the stem 110 by at least one screw.

Please refer to FIG. 5. In detail, the body 130 is actually a one-piece (integral) hollow tube structure. However, the invention is not limited thereto. In other embodiments that are not illustrated, the body can also be a shaped tube/ pillar structure. Besides, the reinforcement member 110 further divides into a fourth segment S4 and a fifth segment S5, and the reinforcement member 110 of the embodiment is also a one-piece hollow tube structure. By assembling the first segment S1 of the body 130 and the fourth segment S4 of the reinforcement member 110 together onto the stem 11 (the first segment S1 and the fourth segment S4 are substantially held between a part 11a and a part 11b of the stem 11), and also held together with a bushing 120 so as to enhance a clamping force between related members, such that the body 130 and the reinforcement member 110 are successfully fixed to the stem 11. Meanwhile, the bushing 120 is also used to make up an outer diameter of the first segment S1 of the body 130. That is, the body 130 (together with the bushing 120) is applied to stem size of the current bicycle. Accordingly, with the aforementioned configuration means, the body 130 and the reinforcement member 110 are seen as having the same fixed point (the fixed point can also be any point on the body 130, which is not on the handlebar structure 100 of the bicycle 10). Furthermore, the reinforcement member 110 of the embodiment is a one-piece member. The fifth segment S5 extends from the fourth segment S4 and covers a portion of the second segment S2. In other embodiments, which are not illustrated, the reinforcement member can also be two independent members separately corresponding to two second segments S2 of the body 130. However, what remains unchanged is that one side of the reinforcement member is still fixed to the body of the bicycle (e.g., the aforementioned stem 11), and the other side is still disposed on the second segment S2.

Figure 3A:
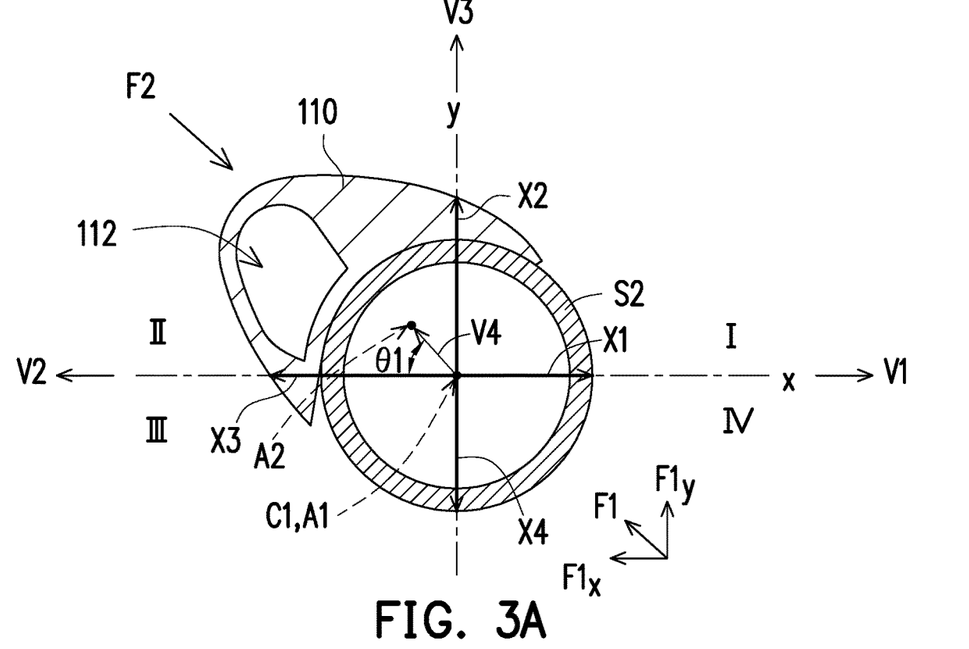
FIG. 3A is a cross-sectional view of the handlebar structure in FIG. 2.
Figure 4:
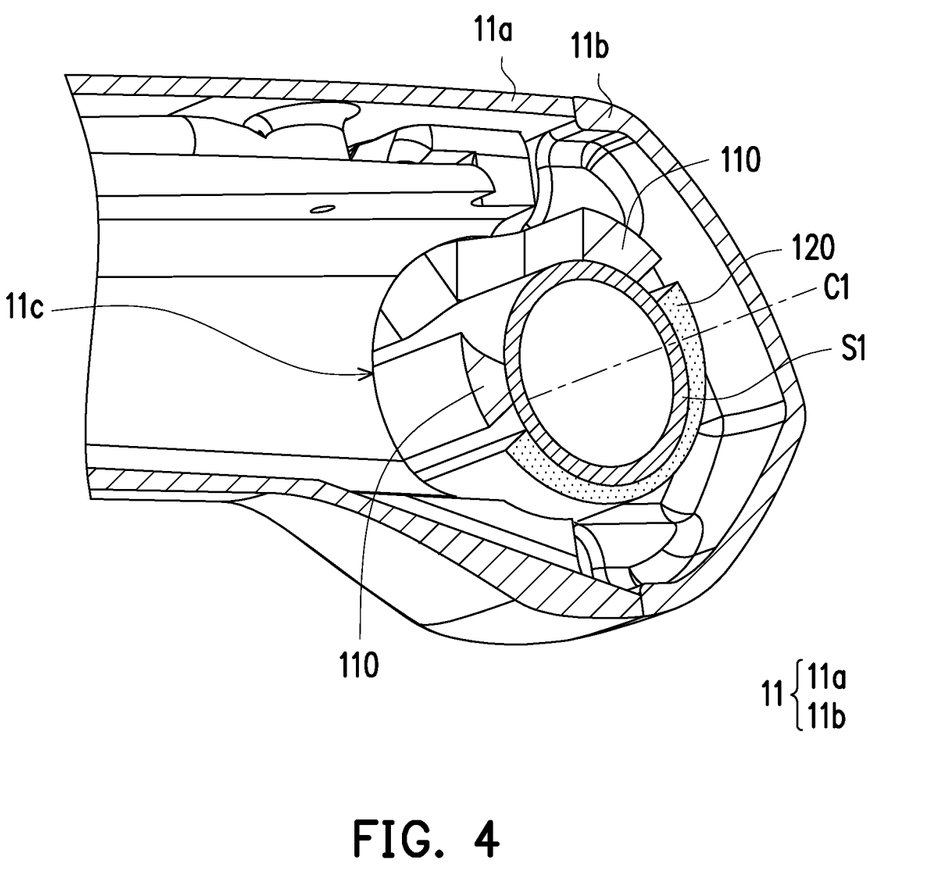
FIG. 4 is a 3D cross-sectional view of the handlebar structure in FIG. 2.

FIG. 3A is a cross-sectional view of the handlebar structure in FIG. 2. FIG. 4 is a 3D cross-sectional view of the handlebar structure in FIG. 2, wherein FIG. 3A is a sectional view of the second segment S2, and FIG. 4 is a cross-sectional view of a portion of the stem 11 on the handlebar structure 100. Please refer to FIG. 3A as well as FIG. 4 and compare with FIG. 2. In this embodiment, a joint area moment of inertia of the second segment S2 and the reinforcement member 110 (as the cross section illustrated in FIG. 3A) is greater than an area moment of inertia of the first segment S1 (as the cross section illustrated in FIG. 4). The joint area moment of inertia is a second axial moment of area, and it is a physical quantity of an object reflecting the shape and size of the cross-section of the object corresponding to an effect of bending deformation. The deformation or the flexibility subject to the bending is not only determined by a load size, but also determined by geometric characteristics of the cross section of the object. Especially, it is a geometrical property of an area (cross-section area) which reflects how its points are distributed with regard to an arbitrary axis.

That is to say, for the body 130 of the handlebar structure 100, the body 130 has a thinner outline. Therefore, when a rider rests or holds both of his hands on the handlebar structure 100, the vibration and discomfort generating from the bicycle 10 in response to the road condition are thus avoided. That is, the cross-section of the area moment of inertia of the body is lowered to enhance the flexibility of the body 130. Effects of absorption and cushion of the vibration are provided to raise the shock absorbing capability of the handlebar structure 100 and enhance the comfortability of the rider.

In contrast, when the rider drives the bicycle 10 to the pumping or pump track state, the rider applies a force on the third segment S3 of the body 130, and thus applies the force F1 on the segment S3 to gain enough support. However, if the body 130 having better flexibility described above, it is restricted to the structural rigidity of the handlebar structure 100, and the required supporting force is thus failed to provide to the rider by the handlebar structure 100 in the pumping or pump track state. Accordingly, by disposing the fifth segment S5 of the reinforcement member 110 onto the second segment S2 of the body 130, the handlebar structure 100 effectively resists the torque caused by the second segment S2 against the force F1. That is to say, the reinforcement member 110 blocks on a deformation direction of the second segment S2 so as to provide an anti-force F2 to the second segment S2 of the body 130. Therefore, with the existence of the reinforcement member 110, the joint area moment of inertia of the second segment and the reinforcement member is greater than the area moment of inertia of the body 130. The structural rigidity of the body 130 on the second segment S2 is effectively enhanced. Thus, the condition that the structural rigidity of the body 130 is insufficient under the pump track state is thus solved.

In other words, it is acquired from the first segment S1 of the body 130 illustrated in FIG. 4 that in terms of the structure of the body 130, a neutral axis A1 of the joint orthogonal cross-section of the body 130 is substantially located on a structure centroid C1 of the body 130. When the structure of the body 130 extends to the second segment S2, as the reinforcement member 110 is completely attached to and against the body 130, a neutral axis A2 of the joint orthogonal cross-section of the body 130 and the reinforcement member 110 is regarded as having an offset relative to the neutral axis A1 of the first segment S1. An offset direction V4 is essentially away from a (riding) ground plane 20 (as illustrated in FIG. 1) of the bicycle 10, and renders an included angle θ1 with the ground plane 20. The included angle θ1 is less than 90° or equal to 90°. The offset direction V4 is the same as the deformation direction of the second segment S2 or the direction of force applied onto the third segment S3 by the rider while being in the pumping or pump track state.

Figure 3B:
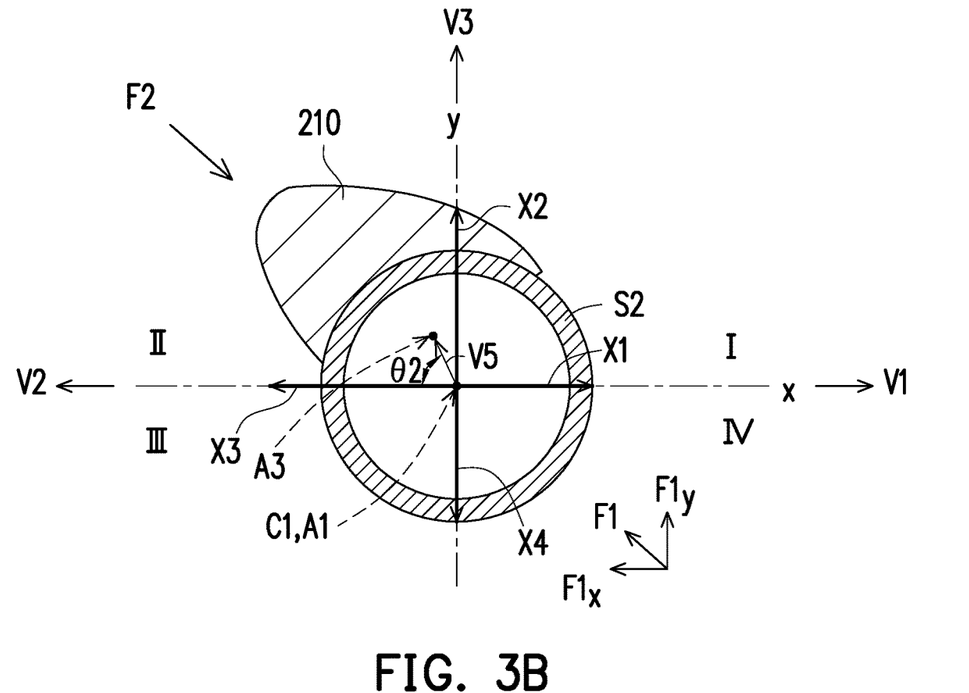
FIG. 3B is a cross-sectional view of a handlebar according to another embodiment of the invention.

That is to say, as illustrated in FIG. 3A, in the two-dimensional Cartesian system x-y constructed based on an orthogonal cross-section of the second segment S2, a scope of the second segment S2 covered by the reinforcement member 110 contains at least a prat of a second quadrant II. At this time, an orthogonal projection of the third segment S3 on the two-dimensional Cartesian system x-y is located in a fourth quadrant IV and is opposite to the reinforcement member 110. Furthermore, the scope of the second segment S2 covered by the reinforcement member 110 could further extends from the second quadrant II to a first quadrant I or a third quadrant III to ensure that all possible direction of the force F1 on (the third segment S3 of) the handlebar structure 100 provided by the rider in the pump track state are covered. At this time, the neutral axis A2 of the joint orthogonal cross-section of the second segment S2 and the reinforcement member 110 is located in the second quadrant II. FIG. 3B is a cross-sectional view of a handlebar according to another embodiment of the invention. Referring to FIG. 3B, a scope of a second segment S2 covered by a reinforcement member 210 contains a part of the second quadrant II and being extended to the first quadrant I. An offset direction V5 with included angle θ2 is performed in FIG. 3B, wherein a neutral axis A3 of the joint orthogonal cross-section of the body 130 and the reinforcement member 210 is closer to the y-axis than the neutral axis A2. In another embodiment, a scope of the second segment S2 covered by the reinforcement member 110 contains a part of the second quadrant II. In another embodiment, a scope of the second segment S2 covered by the reinforcement member 110 contains a part of the second quadrant II and being extended to the third quadrant III.

Here, the x-axis of the two-dimensional Cartesian system x-y is parallel to the (riding) ground plane 20 where the bicycle 10 is, and the y-axis of the two-dimensional Cartesian system is orthogonal to the (riding) ground plane 20 where the bicycle 10 is. As illustrated in FIG. 3A, a component $F1_x$ is the component of the force F1 parallel to the ground plane 20, and a component $F1_y$ is the component of the force F1 orthogonal to the ground plane 20. That is to say, the force F1 of the rider changes based on the variation of the components $F1_x$ and $F1_y$, which means that the force F1 changes along with the center of gravity and the force practice of the rider. However, what remains unchanged is that the force F1 keeps in the third quadrant III in the pump track state.

In other words, please further refer to FIG. 3A. For a self-structure of the bicycle 10, when the bicycle takes the first direction V1 as a moving direction, the scope of the reinforcement member 110 covering on the second segment S2 is enough to cover and block the reinforcement member 110 on the deformation direction of the second segment S2. The deformation direction here substantially includes a second direction V2, a third direction V3, and any direction included and between these two, wherein the second direction V2 is contrary to the first direction V1, and the third direction V3 is deviated from the ground plane 20 (as illustrated in FIG. 1).

In the embodiment illustrated in FIG. 3A, the first direction V1 is substantially a positive x-axis direction. The second direction V2 is substantially a negative x-axis direction of the two-dimensional Cartesian system x-y. The third direction V3 is substantially a positive y-axis direction of the two-dimensional Cartesian system x-y. However, as a slope of the ground plane 20 changes, the force that the rider provides on the body 130 in the pump track state also changes. Therefore, the reinforcement member 110 extends from the second quadrant II to the first quadrant I or the third quadrant III. In other words, the third direction V3 changes accordingly.

Surely, as observation aspects of the Cartesian system vary, the directions for describing the members change accordingly. For example, observing from the relative angle of view (sight line shooting out from the paper surface), t the scope of the second segment S2 covered by the reinforcement member 110 contains at least the first quadrant I. The orthogonal projection of the third segment S3 on the two-dimensional Cartesian system x-y, at this time, is located in the third quadrant III. Moreover, the scope of the second segment S2 covered by the reinforcement member 110 extends from the first quadrant I to the second quadrant II or the fourth quadrant IV. The neutral axis of the joint orthogonal cross-section of the second segment S2 and the reinforcement member 100 is located in the first quadrant I. The force F1 of the rider on the third segment S3 is located in the quadrant III. The bicycle 10 moves in the negative x-axis direction.

In other words, since the second segment S2 is disposed as a straight line, the joint orthogonal cross-section of the second segment S2 and the reinforcement member 110 forms a first vector X1 (an intersection point of the second segment S2 and the positive x-axis), a second vector X2 (an intersection point of the reinforcement member 110 and the positive y-axis), a third vector X3 (an intersection point of the reinforcement member 110 and the negative x-axis), and a fourth vector X4 (an intersection point of the second segment S2 and the negative y-axis). As illustrated in FIG. 3A, for the second segment S2, with the existence of the reinforcement member 110, the length of the third vector X3 is greater than that of the first vector X1, while the length of the second vector X2 is greater than that of the fourth vector X4. That is to say, after a user gets the joint area moment of inertia with simple tools, and directly measures an outer size of the second segment S2 and the reinforcement member 110, the corresponding position and relationship of the reinforcement member 110 relative to the second segment S2 are thus acquired accordingly. Adjustments are thus to be made according to required conditions and the description above.

Based on the above, in this embodiment, with the existence of the reinforcement member 110, the outline of the body 130 is designed to enhance its flexibility. In general, taking a road bike as an example, an outer diameter of the body 130 reduces to less than 26 mm, and specifically, an outer diameter of the first segment S1 is 26 mm, then the diameter further reduces to 24 mm while being extended to the second segment S2 and the third segment S3. Compared with the handlebar structure of the previous techniques, the embodiment provides better shock absorbing capability and the comfortability. The condition of insufficient structural rigidity is avoided.

On the other hand, please further refer to FIG. 2. In this embodiment, the bicycle 10 further includes a brake lever assembly 12, which includes a brake lever 12a disposed on the third segment S3 and a brake wire 12b connected to the brake lever 12a. The brake wire 12b passes through a horizontal through-hole 112 of the reinforcement member 110 and emerges into the stem 11. In this way, though the handlebar structure 100 has the reinforcement member on the outside, the brake wire 12b is thus hidden to achieve storage and aesthetic effect.

Figure 6:
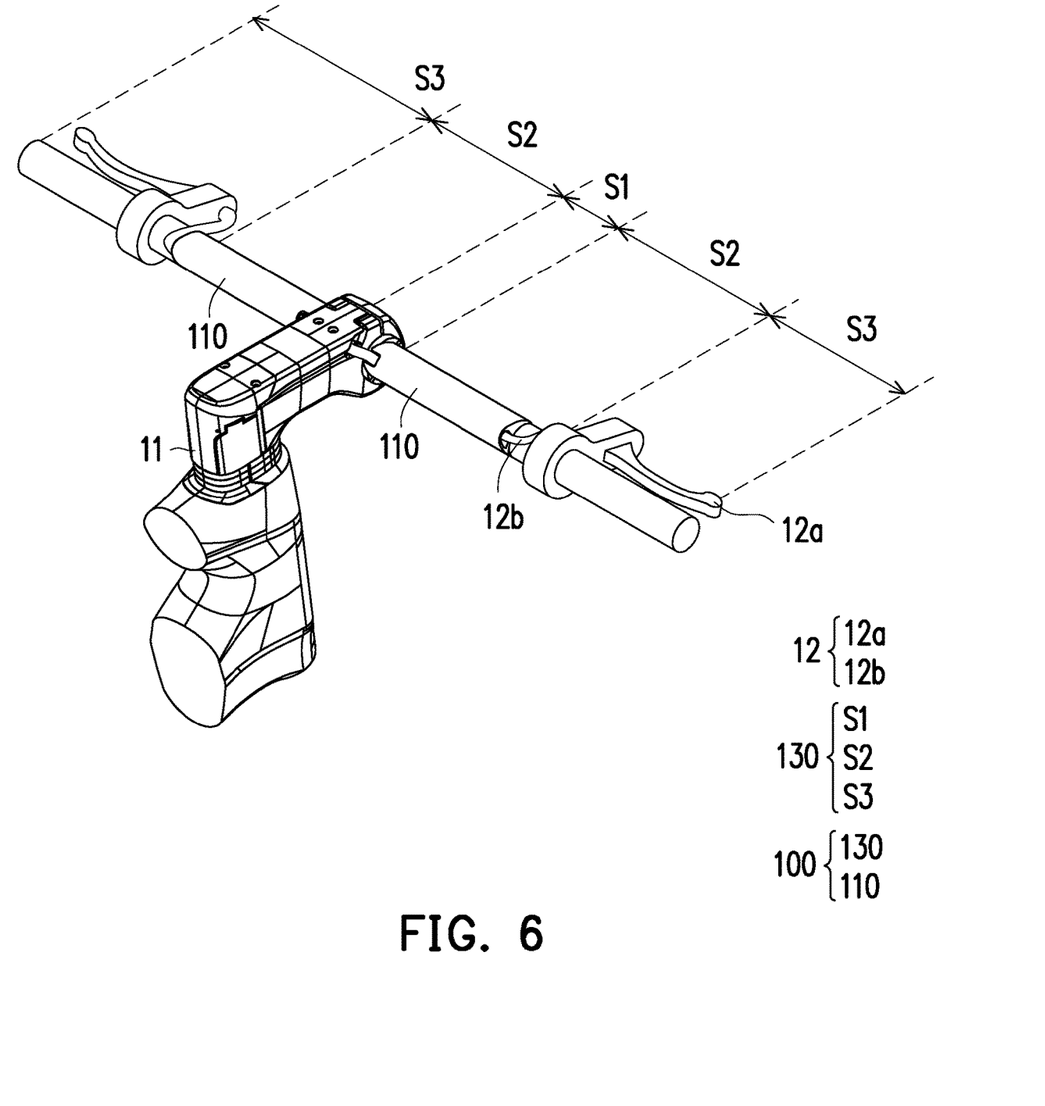
FIG. 6 is a partial schematic view of a bicycle according to another embodiment of the invention.

FIG. 6 is a partial schematic view of a bicycle according to another embodiment of the invention. Different from the aforementioned embodiments, the handlebar structure of the embodiment is a flat structure. That is, the body 130 is substantially a straight tube structure. What remains the same is that the reinforcement member 110 still covers on the second segment S2 of the body 130, and the area where it covers is the same as the aforementioned embodiments. Therefore, the reinforcement member 110 achieves the block effect same as well.

Based on the foregoing, in the above-mentioned embodiments of the invention, the handlebar structure of bicycle includes the body and the reinforcement member, wherein one side of the reinforcement member is fixed to the stem with the body. The other side of the reinforcement member is disposed on the second segment of the body. By doing so, the body is designed with better flexibility, such that the vibration produced in response to traveling by the bicycle is absorbed by the handlebar structure. Thus, the rider is able to rest his hands on the handlebar structure without being affected by the discomfort caused by the vibration. That is to say, structurally, the reinforcement member substantially enhances the area moment of inertia of the second segment, and the neutral axis on the area moment of inertia of the body renders offset at the second segment. An offset direction deviates from the ground plane where the bicycle is. That is, the offset direction is the same direction of the force applied by the rider on the third segment.

In other words, the reinforcement member is disposed corresponding to the deformation direction of the second segment. That is, in the two-dimensional Cartesian system x-y constructed based on an orthogonal cross-section of the second segment of the body, the reinforcement member substantially covers the whole second quadrant and extends toward the first quadrant and the third quadrant. At this time, the third segment is located in the fourth quadrant. That is to say, the position of the second segment covered by the reinforcement member corresponds to the corresponding force direction of the rider on the handlebar. Therefore, when the rider pumps back, though the force caused by the third segment may produce deformation factors of the second segment of the body owing to torque, the reinforcement member blocks the deformation direction of the second segment to strengthen the structural rigidity of the body on the second segment. The deformation factors are thus effectively eliminated, and the handlebar structure maintains better structural rigidity in this state to provide enough supporting force for the rider.

Although the embodiments are already disclosed as above, these embodiments should not be construed as limitations on the scope of the invention. It will be apparent to those ordinarily skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:
1. A handlebar structure of bicycle suited for being assembled to a stem of a bicycle, the handlebar structure comprising:
  a body, having a first segment, a second segment, and a third segment, wherein the first segment is fixed to the stem, the second segment is connected between the first segment and the third segment, and the third segment is extended from the second segment to form an end structure of the body; and a reinforcement member, a portion of the reinforcement member and the stem being fixed to each other while another portion of the reinforcement member disposed on the second segment, and a two-dimensional Cartesian system x-y constructed based on an orthogonal cross-section of the second segment, and a scope of the second segment being covered by the reinforcement member containing at least a part of a second quadrant of the two-dimensional Cartesian system x-y, wherein a bicycle moves in a positive x-axis direction of the two-dimensional Cartesian system x-y.

2. The handlebar structure of bicycle according to claim 1, wherein a joint area moment of inertia of the second segment and the reinforcement member is greater than an area moment of inertia of the first segment.

3. The handlebar structure of bicycle according to claim 1, wherein a neutral axis of a joint orthogonal cross-section of the second segment and the reinforcement member renders an offset relative to a neutral axis of the orthogonal cross-section of the first segment.

4. The handlebar structure of bicycle according to claim 3, wherein an offset direction deviates from a ground plane where the bicycle is.

5. The handlebar structure of bicycle according to claim 4, wherein the offset direction renders an included angle relative to the ground plane, and the included angle is less than 90° or equal to 90°.

6. The handlebar structure of bicycle according to claim 1, wherein an orthogonal projection of the third segment on the two-dimensional Cartesian system is located in a fourth quadrant.

7. The handlebar structure of bicycle according to claim 6, wherein the scope of the second segment covered by the reinforcement member extends from the second quadrant to a first quadrant or a third quadrant of the two-dimensional Cartesian system.

8. The handlebar structure of bicycle according to claim 6, wherein a neutral axis of the joint orthogonal cross-section of the second segment and the reinforcement member is located in a second quadrant.

9. The handlebar structure of bicycle according to claim 6, wherein an x-axis of the two-dimensional Cartesian system is parallel to a ground plane where the bicycle is, and a y-axis of the two-dimensional Cartesian system is orthogonal to the ground plane where the bicycle is.

10. The handlebar structure of bicycle according to claim 1, wherein the reinforcement member has a fourth segment and a fifth segment, the fourth segment and the first segment are held by the stem, and the fifth segment extends from the fourth segment and covers a portion of the second segment.

11. The handlebar structure of bicycle according to claim 10, further comprising:
a bushing, held together with the second segment and the fourth segment by the stem.

12. The handlebar structure of bicycle according to claim 1, wherein the bicycle has a brake lever and a brake wire, the brake lever is disposed on the third segment, and the brake wire is connected to the brake lever, passes through the reinforcement member, and merges into the stem.

13. The handlebar structure of bicycle according to claim 1, wherein the joint orthogonal cross-section of the second segment and the reinforcement member forms a first vector on a positive x-axis of the two-dimensional Cartesian system, forms a third vector on a negative x-axis thereof, forms a second vector on a positive y-axis thereof, forms a fourth vector on a negative y-axis thereof, and a length of the third vector is greater than a length of the first vector, while a length of the second vector is greater than a length of the fourth vector.

14. A handlebar structure of bicycle suited for being assembled to a stem of a bicycle, the handlebar structure comprising:
a body, having a first segment, a second segment, and a third segment, wherein the first segment is fixed to the stem, the second segment is connected between the first segment and the third segment, and the third segment is extended from the second segment to form an end structure of the body; and
a reinforcement member, one portion of the reinforcement member and the stem being fixed to each other, and another portion of the reinforcement member disposed on the second segment;
the reinforcement member covering the second segment of the body and blocking at a deformation direction of the second segment when a rider drives the bicycle to move on a ground plane along a first direction; the deformation direction comprising a second direction, a third direction, and any direction included and between the second direction and the third direction, wherein the second direction is opposite to the first direction, and the third direction deviates from the ground plane.

15. The handlebar structure of bicycle according to claim 14, wherein the third direction is orthogonal to the ground plane.

16. The handlebar structure of bicycle according to claim 14, wherein the reinforcement member is blocked at a deformation direction of the reinforcement member when the rider applying a force on the third segment and driving the bicycle to a pumping or pump track state.

* * * * *